(12) United States Patent
Metts et al.

(10) Patent No.: US 11,045,710 B2
(45) Date of Patent: Jun. 29, 2021

(54) NON-NEWTONIAN MATERIALS FOR THE PREVENTION OF MILD TRAUMATIC BRAIN INJURY

(71) Applicant: University of South Carolina, Columbia, SC (US)

(72) Inventors: David M. Metts, Columbia, SC (US); Robert Michael Gower, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 15/998,758

(22) Filed: Aug. 16, 2018

(65) Prior Publication Data

US 2019/0054363 A1 Feb. 21, 2019

Related U.S. Application Data

(60) Provisional application No. 62/546,601, filed on Aug. 17, 2017.

(51) Int. Cl.

| A63B 71/10 | (2006.01) |
|---|---|
| A63B 71/08 | (2006.01) |
| A42B 3/06 | (2006.01) |
| A63B 71/12 | (2006.01) |
| B01J 13/00 | (2006.01) |
| A42B 3/14 | (2006.01) |

(Continued)

(52) U.S. Cl.
CPC .......... *A63B 71/081* (2013.01); *A42B 3/0473* (2013.01); *A42B 3/062* (2013.01); *A42B 3/121* (2013.01); *A42B 3/142* (2013.01); *A63B 71/12* (2013.01); *B01J 13/0082* (2013.01); *C08G 65/2609* (2013.01); *C08G 77/38* (2013.01); *C08K 3/36* (2013.01); *A41D 13/0512* (2013.01); *A63B 2071/1208* (2013.01)

(58) Field of Classification Search
CPC ......... A42B 3/0473; A42B 3/063; A42B 3/14; A42B 3/064; A42B 3/04; A42B 3/062; A42B 3/068; A42B 3/121; A42B 3/124; A42B 3/128; A42B 1/08; A42B 3/00; C08L 83/04; C08L 83/08; A63B 71/10; A63B 71/1291; A63B 71/081; A63B 71/12; A63B 60/08; A63B 60/54; A63B 53/08; A63B 60/26; A63B 2243/0025; A63B 2243/007; A63B 71/0054; A63B 71/08; A63B 2071/0063; A41D 13/0512; A41D 13/015; A41D 31/28; A41D 2600/10; A41D 13/00; A41D 13/0531; A41D 2500/50; A43B 7/32; A43B 13/02; A43B 23/0235; A43B 23/028; F16F 1/3605; F16F 13/06; F16F 1/366; F16F 1/371; F16F 2224/041; F16F 9/30
See application file for complete search history.

(56) References Cited

U.S. PATENT DOCUMENTS

| 5,483,698 A * | 1/1996 | Douglas, Jr. ....... A41D 13/0512 2/462 |
|---|---|---|
| 5,493,736 A * | 2/1996 | Allison ................ A42B 3/0473 2/411 |

(Continued)

*Primary Examiner* — Robert H Muromoto, Jr.
(74) *Attorney, Agent, or Firm* — Burr & Forman LLP; Douglas L. Lineberry

(57) ABSTRACT

An improved design for an athletic helmet incorporating non-Newtonian fluid shock absorbing structures.

21 Claims, 10 Drawing Sheets

(51) Int. Cl.
  *C08G 65/26* (2006.01)
  *C08K 3/36* (2006.01)
  *C08G 77/38* (2006.01)
  *A42B 3/12* (2006.01)
  *A42B 3/04* (2006.01)
  *A41D 13/05* (2006.01)

(56) References Cited

U.S. PATENT DOCUMENTS

| | | | | |
|---|---|---|---|---|
| 6,006,368 A * | 12/1999 | Phillips | ............... | A42B 3/0473 2/421 |
| 6,481,026 B1 * | 11/2002 | McIntosh | ............ | A41D 13/0512 2/416 |
| 8,528,113 B2 * | 9/2013 | Siegler | ............... | A42B 3/0473 2/410 |
| 10,178,888 B2 * | 1/2019 | Wetzel | ............... | A42B 3/0473 |
| 10,188,159 B2 * | 1/2019 | Armour | ............ | A41D 13/0512 |
| 10,195,506 B2 * | 2/2019 | Lammer | ............ | A41D 13/015 |
| 2009/0191989 A1 * | 7/2009 | Lammer | ............ | A41D 13/015 473/535 |
| 2009/0300949 A1 * | 12/2009 | Frederick | ............ | A43B 13/189 36/35 R |
| 2010/0192290 A1 * | 8/2010 | Husain | ............ | A41D 13/0512 2/468 |
| 2010/0221521 A1 * | 9/2010 | Wagner | ............ | B01F 17/0028 428/315.5 |
| 2011/0277225 A1 * | 11/2011 | Salkind | ............ | A42B 3/0473 2/461 |
| 2011/0302700 A1 * | 12/2011 | Vito | ............ | A42B 3/14 2/412 |
| 2012/0094789 A1 * | 4/2012 | Lammer | ............ | A41D 13/015 473/535 |
| 2012/0096630 A1 * | 4/2012 | Ferguson | ............ | A42B 3/124 2/410 |
| 2012/0121876 A1 * | 5/2012 | Milesi | ............ | C08L 53/025 428/220 |
| 2012/0142239 A1 * | 6/2012 | Budden | ............ | C08L 83/04 442/59 |
| 2012/0186003 A1 * | 7/2012 | Heger | ............ | A41D 13/015 2/412 |
| 2013/0000020 A1 * | 1/2013 | Frederick | ............ | A42B 3/121 2/455 |
| 2013/0032316 A1 * | 2/2013 | Dhiman | ............ | B08B 17/065 165/133 |
| 2013/0034695 A1 * | 2/2013 | Smith | ............ | B08B 17/065 428/143 |
| 2013/0055492 A1 * | 3/2013 | Husain | ............ | A42B 3/0473 2/468 |
| 2013/0251946 A1 * | 9/2013 | Azimi | ............ | B05D 5/00 428/142 |
| 2013/0269089 A1 * | 10/2013 | Green | ............ | C08J 3/005 2/455 |
| 2013/0283507 A1 * | 10/2013 | Baty | ............ | A42B 3/14 2/416 |
| 2013/0296755 A1 * | 11/2013 | Duncan | ............ | A61F 5/05883 602/18 |
| 2014/0080640 A1 * | 3/2014 | Lammer | ............ | A41D 13/015 473/522 |
| 2014/0223644 A1 * | 8/2014 | Bologna | ............ | A42B 3/20 2/414 |
| 2014/0309330 A1 * | 10/2014 | Wei | ............ | C08L 83/00 523/202 |
| 2015/0126631 A1 * | 5/2015 | Bruno | ............ | A42B 3/125 521/54 |
| 2015/0223542 A1 * | 8/2015 | Fischell | ............ | A42B 3/0473 2/461 |
| 2017/0150767 A1 * | 6/2017 | Wetzel | ............ | A63B 71/10 |
| 2018/0147474 A1 * | 5/2018 | Hodge | ............ | A63B 71/1291 |
| 2019/0145740 A1 * | 5/2019 | Czerski | ............ | A41D 31/28 2/463 |

\* cited by examiner

NON-NEWTONIAN MATERIALS FOR THE PREVENTION OF MILD TRAUMATIC BRAIN INJURY

BACKGROUND OF THE INVENTION

1) Field of the Invention

The present invention relates to an improved design for an athletic helmet or other headwear incorporating non-Newtonian fluid shock absorbing structures and a method for dispersing impact force from an athletic helmet.

2) Description of Related Art

Protecting players who participate in athletics is a major concern in the United States. For example, there are almost 1.1 million high school athletes and 70 thousand college athletes that play football annually. The 30 billion dollar NFL franchise released 2015 regular season injury statistics citing 182 concussions among approximately 1,700 professional football players. Ensuring that these players remain as safe as possible playing football is a preeminent concern from both safety and sport enjoyment aspects.

Prior art efforts to improve athletic helmets exist. For example, Bologna, U.S. Pat. Pub. 2014/0223644, discloses a protective football helmet having a one-piece molded shell with an impact attenuation system. This system includes an impact attenuation member formed in the front shell portion by removing material from the front portion. The impact attenuation member is purposely engineered to change how the front portion responds to an impact force applied substantially normal to the front portion as compared to how other portions of the shell respond to that impact force. In one version, the impact attenuation member is a cantilevered segment formed in the front portion of the shell.

Philips, U.S. Pat. No. 6,006,368, discloses a combination shoulder pad and helmet assembly uniquely designed to protect a user from serious cervical spine injuries. The device comprises a helmet having a mounting bracket on the back portion thereof. The mounting bracket has a pair of opposing embrasures in communication with an axial, cylindrical bore. An elongated tubular rod is received within the bore having an indention at opposing ends thereof. The rod is retained within the bore using a spring biased pin received within the embrasures and the indention which also limits the rotation of the rod relative to the cylindrical bore. The spring biased pin has a concave portion proximal its head which may be selectively aligned with the rod indention to release the rod from the brackets. The opposing end of the rod is secured to a similar bracket and pin mechanism mounted to the top edge of a set of shoulder pads. Furthermore, a mid-torso protective device is secured to the lower edge of the shoulder pads. The assembly is designed to limit the movement of a football player's head relative to the body to minimize the potential for serious, paralyzing cervical injuries, as well as, to protect the player from breath-taking blows to the abdomen. See FIG. 1.

Allison, U.S. Pat. No. 5,493,736, discloses a modified football helmet with an inner cap attached by elastic straps to the inside of the helmet shell providing a space above the cap. The helmet is further modified incorporating a rigid collar extending outwardly from the bottom of the helmet which has a lower surface positioned a distance above two upright post members extending upwardly from the rigid shoulder pads. See FIG. 2.

McIntosh, U.S. Pat. No. 6,481,026, discloses a neck and spine brace device for athletes that allows a free and natural range of head motion while providing a stabilization link between a helmet and force absorbing body protection. The interlinking brace yields under torsional and multi-load flexation while compression of the helmet loads are transferred under longitudinal force dispersion to shoulder protection pads of the user. See FIG. 3.

Siegler, et al., U.S. Pat. No. 8,528,113, discloses a cervical spine protection apparatus having one or more composite/elastic bands attached to provide restraint of one or more motions of the cervical spine of the wearer. The apparatus is designed to protect the wearer from incurring cervical spinal injuries, and/or to reduce the severity of cervical spine injuries without substantially compromising the normal functional range of motion of the wearer's cervical spine. See FIG. 4.

Douglas, U.S. Pat. No. 5,483,698, discloses a football shoulder pad assembly with an improved helmet support and restrictor to minimize rearward hyperextension and whiplash-type head movement. The support and movement restrictor comprises a compression molded plastic support plate having opposed wing portions which are secured to the back plates of the shoulder pad assembly and an upward extending cantilever portion of the support plate having a side-to-side curvature to form a concave surface for engagement with the lower rear portion of the helmet. The cantilever portion is curved rearwardly away from the player's head and neck to minimize interference with normal movement of his head. The cantilever portion may flex during use to absorb impact-type hyperextension and whiplash forces. A removable cushion is secured to the cantilever portion of the support plate and includes a pad which may be adjustably fitted against the concave surface of the support plate by opposed flaps which include hook and loop fastener pieces secured thereto for attaching the cushion to the support plate. The restrictor may be retrofitted to existing shoulder pad assemblies. See FIG. 5.

Several types of helmet restrictors have been developed for athletes participating in severe contact sports, such as football, wherein the player's helmet, for example, is interconnected with a set of shoulder pads, other support structure worn on the shoulders, or by a brace which restricts backward movement of the helmet. However, these devices also severely limit rotational or side-to-side movement of the head, which is usually unwanted by the player and may interfere with play execution as a result of the limitations on head movement.

Yet another type of conventional protective device used by football athletes, in particular, comprises a cushion-like collar which is attached to the shoulder pads and substantially encircles the neck between the helmet and the pads. This type of collar is uncomfortable and limits head movement in directions which the player may wish to make. Such types of collars also tend to sometimes exert a choking effect on the wearer when severely deflected or purposely or inadvertently grabbed by another player during play action. Moreover, some conventional restraint devices have also been constructed in a manner which does not adequately take advantage of the load reacting and distributing capability of the largest structure worn by a football player, namely the shoulder pad assembly.

Modern helmets do a good job of preventing skull fracture due to high energy collisions; however, research indicates these devices do not protect against the brain striking the inside of the skull, which causes traumatic brain injuries such as concussions. Accordingly, it is an object of the present disclosure to provide force bearing members containing non-Newtonian fluids that link the helmet to shoulder pads as a strategy to decrease the force due to collision so that the brain does not sustain injury.

SUMMARY OF THE INVENTION

The above objectives are accomplished according to the present invention by providing in a first embodiment, a force distribution system. The system includes a helmet and a force protective carapace. The helmet is in physical communication with the protective carapace at at least one point, wherein physical communication is achieved via affixing a force bearing member to at least one location on the helmet and at least one location on the protective carapace. The force bearing member comprises a non-Newtonian dilatant fluid. Further, the protective carapace at least partially covers the shoulders of a user. Still further, the helmet is a sports helmet. Yet still, the protective carapace comprises a shoulder pad protective system. Furthermore, at least two force distribution members may connect the helmet to the protective carapace. Still yet further, the force distribution members may be permanently affixed to the helmet and protective carapace. Yet still, the force bearing member does not comprise a foam. Further still, the non-Newtonian dilatant fluid is liquid at room temperature. Yet further, the non-Newtonian dilatant fluid comprises a suspension. Further yet still, the non-Newtonian dilatant fluid comprises silica and polyethylene glycol. Even further, the non-Newtonian dilatant fluid comprises cross-linked polydimethylsiloxane In an alternative embodiment, a method of force distribution is provided. The method includes forming at least one force bearing member. The force bearing member contains at least one non-Newtonian dilatant fluid. A first end of the at least one force bearing member is attached to a headpiece. A second end of the at least one force bearing member is attached to a shock receiving structure. Force impacts on the headpiece will be at least partially transferred to the shock receiving structure via the at least one force bearing member. Further, the non-Newtonian dilatant fluid is liquid at room temperature. Still further, the non-Newtonian dilatant fluid comprises a suspension. Yet further, the non-Newtonian dilatant fluid comprises silica and polyethylene glycol. Further again, the non-Newtonian dilatant fluid comprises cross-linked polydimethylsiloxane.

In a further embodiment, a method of retrofitting protective equipment to improve force transfer is provided. One end of at least one force bearing member is connected to a helmet. An opposite end of at least one force bearing member is connected to a protective carapace. The force bearing member comprises a non-Newtonian dilatant fluid. Further, the non-Newtonian dilatant fluid is liquid at room temperature. Still yet, the non-Newtonian dilatant fluid comprises a suspension. Yet again, the non-Newtonian dilatant fluid comprises silica and polyethylene glycol. Further yet, the non-Newtonian dilatant fluid comprises cross-linked polydimethylsiloxane.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
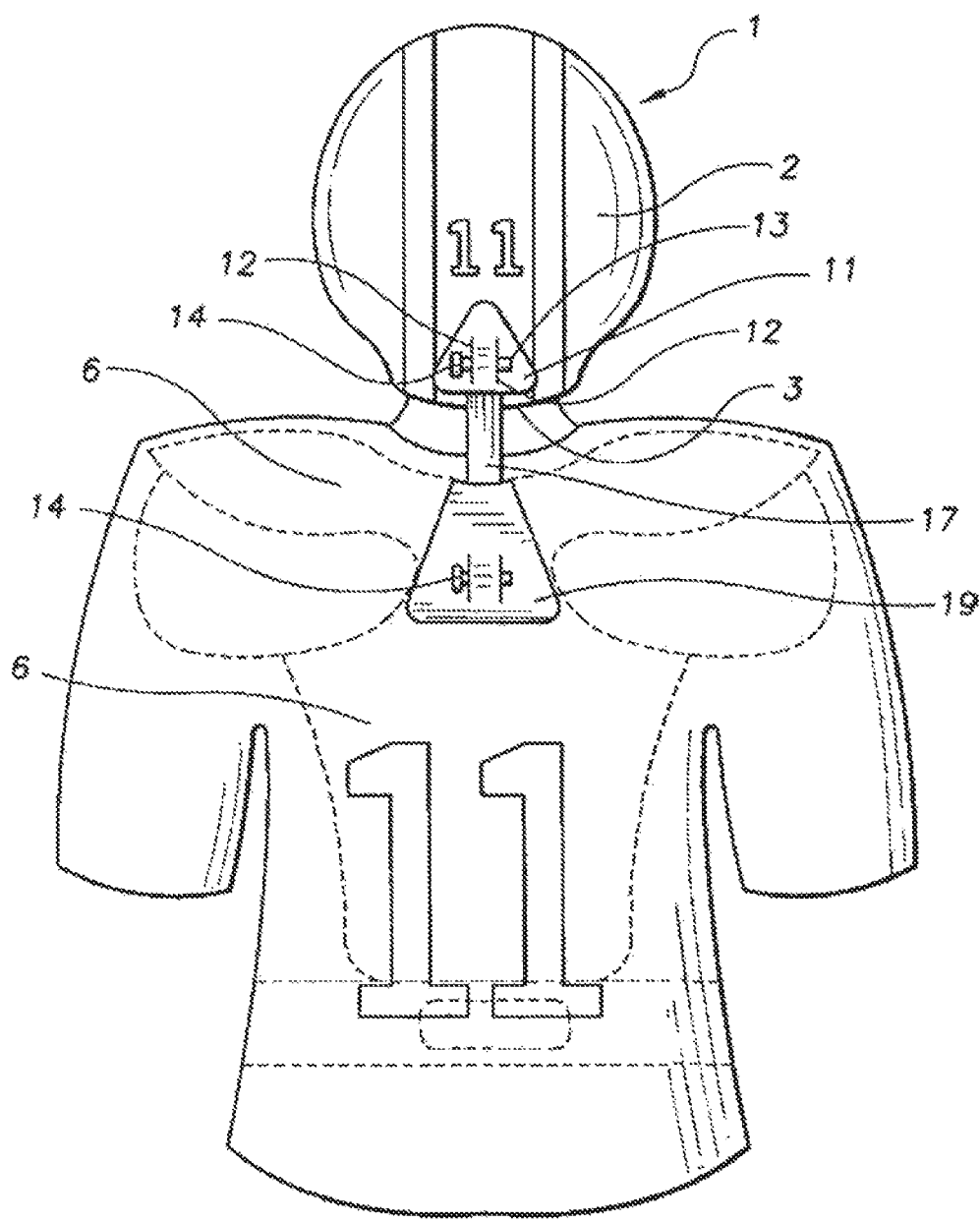
FIG. 1 shows a prior art football helmet.
Figure 2:
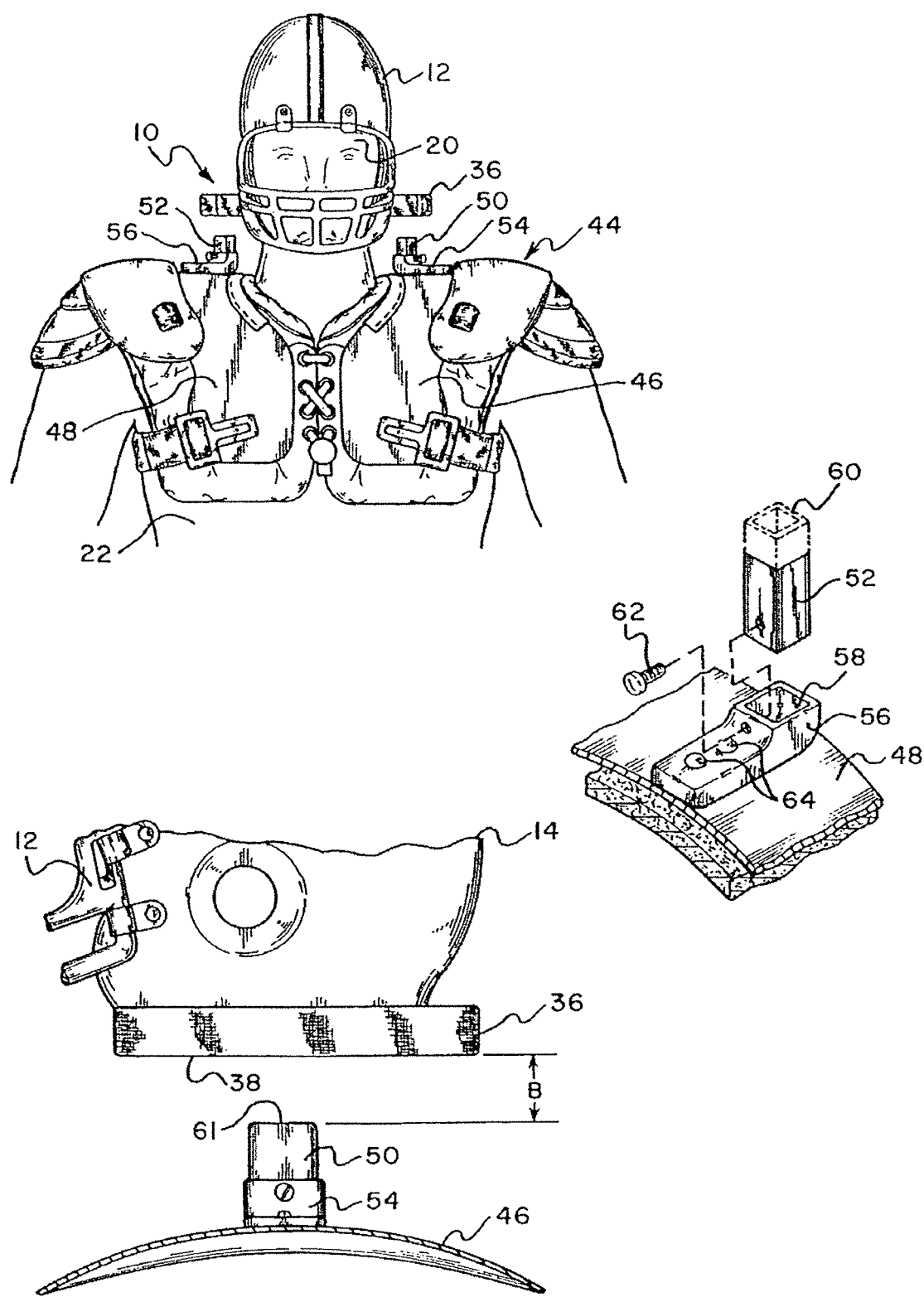
FIG. 2 shows a prior art system connecting a football helmet to shoulder pads.
Figure 3:
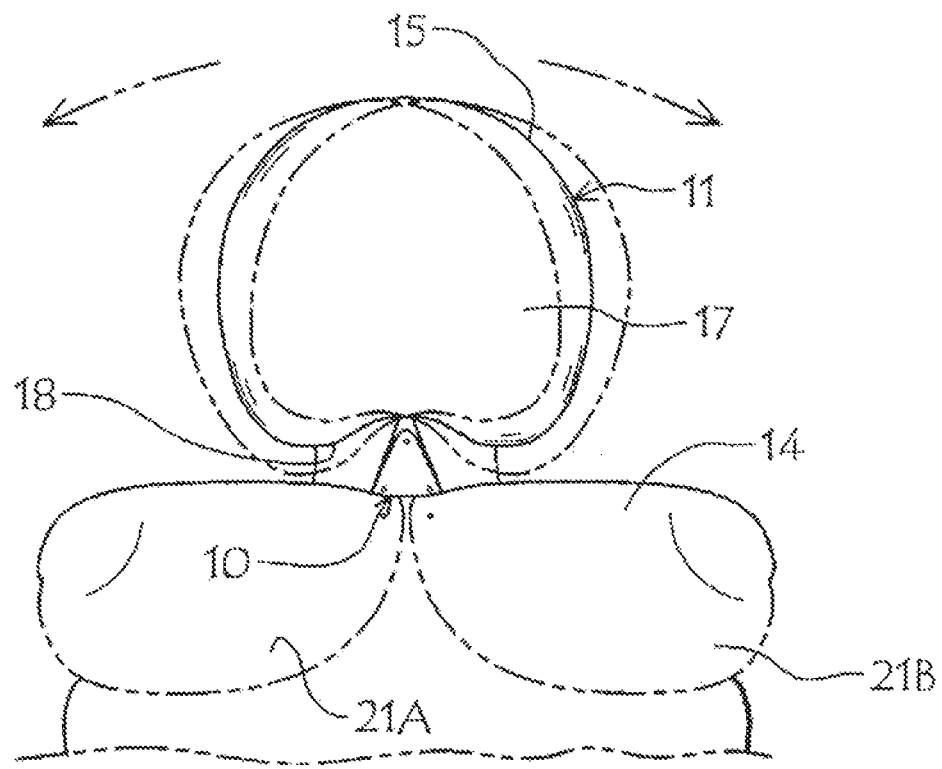
FIG. 3 also shows a prior art system connecting a football helmet to shoulder pads.
Figure 4:
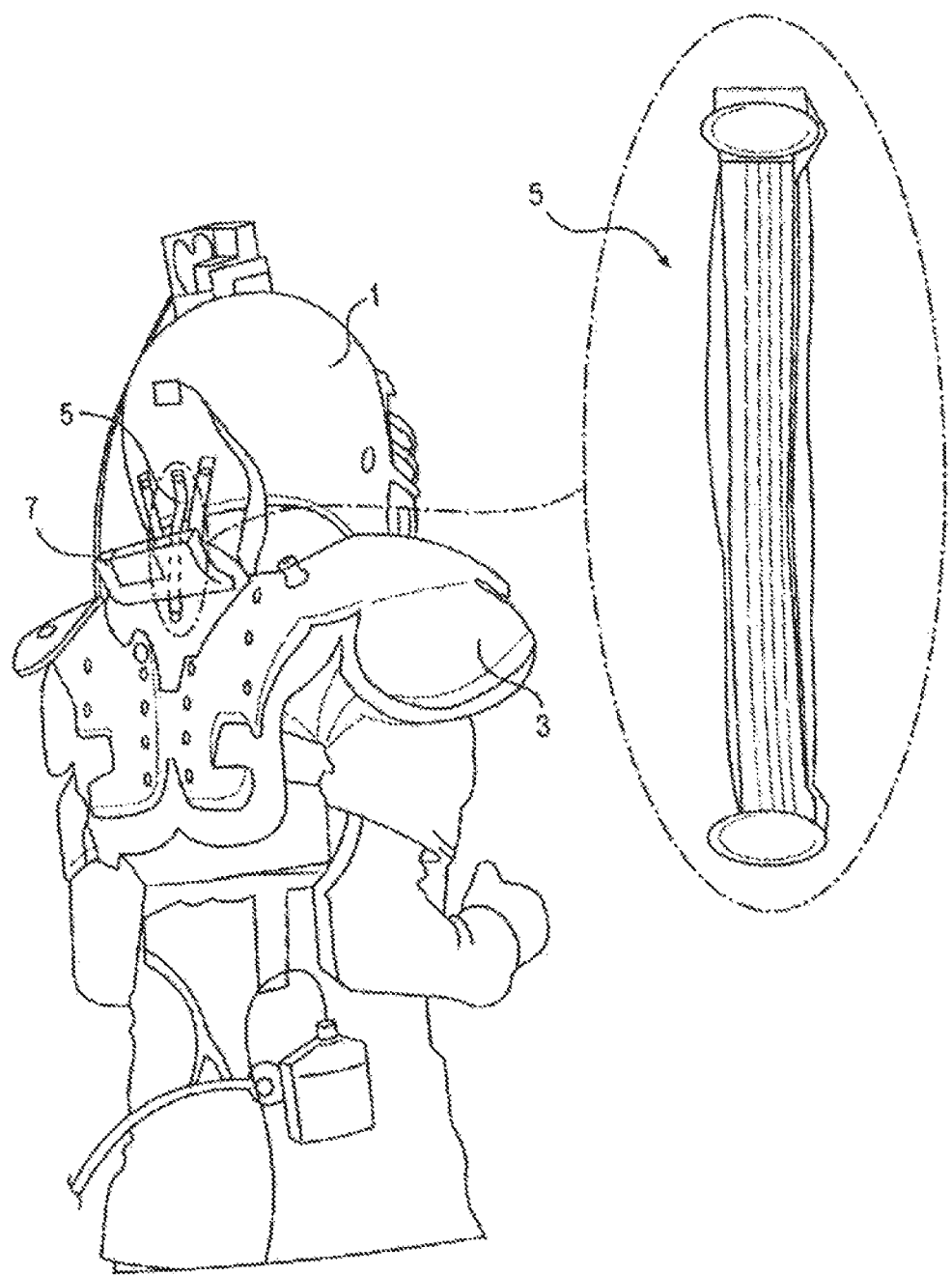
FIG. 4 shows a prior art system for limiting movement of a football helmet on a player's head.
Figure 5:
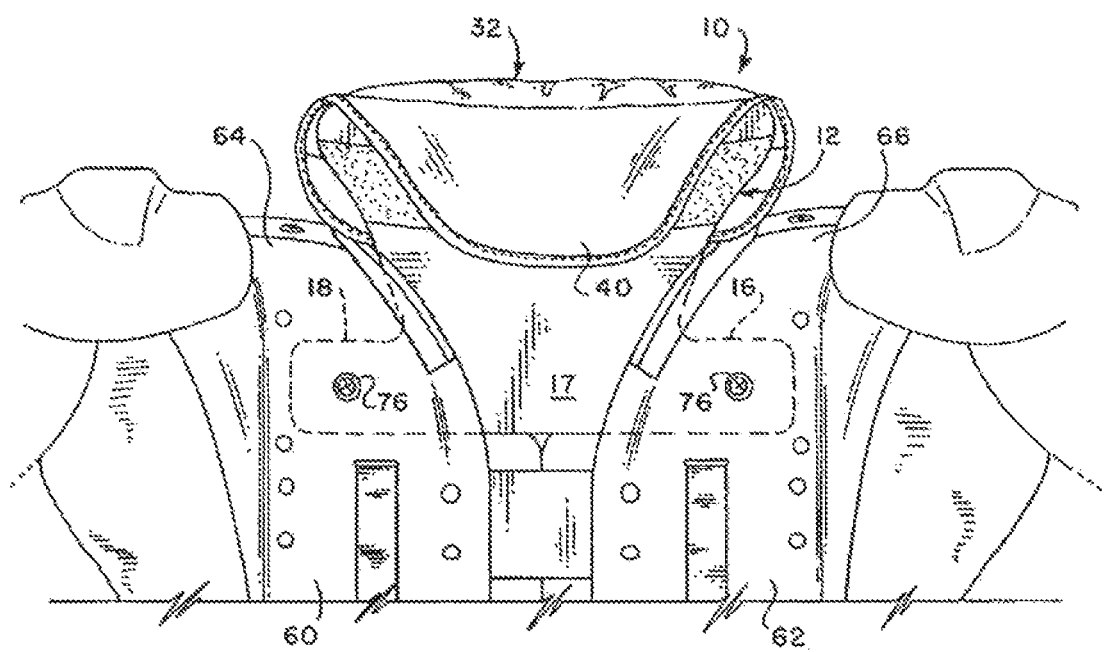
FIG. 5 shows a prior art system affixing a collar to a set of shoulder pads.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 6:
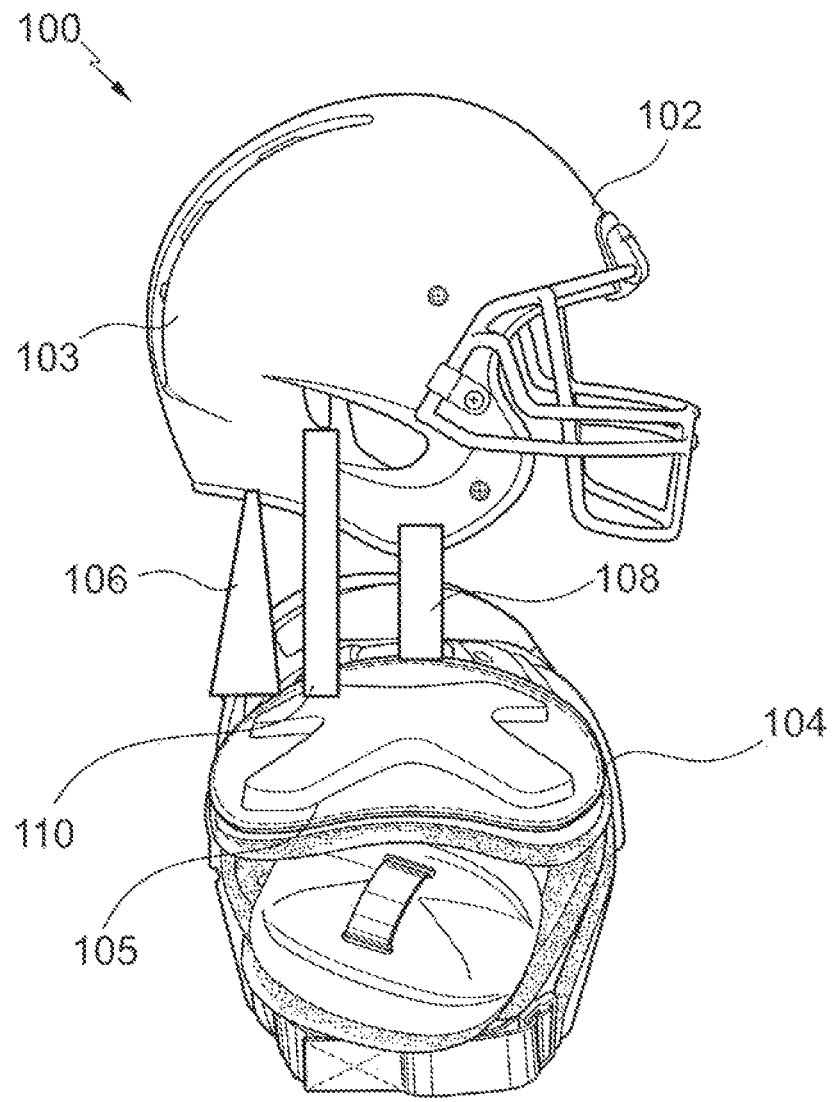
FIG. 6 shows a side-profile of one embodiment of a force distribution system of the current disclosure.

In one embodiment, a new design for the standard football helmet, other sports helmet such as used in lacrosse, hockey, etc., or safety equipment, such as a hardhat and shoulder protector is provided to enhance protection from traumatic brain injuries such as concussions. FIG. 6 shows a side-profile of a force distribution system 100 of the current disclosure. Force distribution system 100 may include a helmet 102, shoulder pads 104, and force distribution members 106, 108 and 110. Although three force distribution members are shown in FIG. 6, the current disclosure is not so limited and more or less force distribution members are considered within the scope of the disclosure. Further, the relative locations of force distribution members 106, 108, and 110 should also not be considered limited by the placements shown in the Figures of this disclosure. Various placements for the force displacement members are possible with respect to one another including opposite placement, triangular placement, square formation, a semi-circle placement, an "open ring" of force distribution members extending down from the helmet but not statically affixed to the shoulder pads, such as via the use of ties or other connectors, etc.

In one embodiment, a preferred arrangement would be one on each side by the ear piece extending down to a shoulder pad connection with the purpose of transferring the impact force from the helmet to the shoulder pad. Also a third member would be used at the back of the helmet extending down to the should pad. Envision a three-legged stool in a plane to accommodate and compensate for angular and straight-on force impacts. Further, particular force distribution members may be placed on the helmet irrespective of placement of other force distribution members. Further, force distribution members may be placed in groups of two or more at locations on the helmet perimeter 103. Moreover, as FIG. 6 shows, force distribution members 106, 108, and 110 may comprise different geometrical shapes in order to better distribute forces applied to the wearer's helmet. Indeed, polygon, round, semi-rounded, hybrid polygon/round, cube, spherical shapes, columnar, etc., as known to those of skill in the art, may form the force distribution members of the current disclosure. In a further embodiment, round or oval shaped members with a cross sectional area sufficient to transfer impact force. The force distribution members may be affixed to the helmet removeably or permanently. In one embodiment, force distribution members may be integral with the helmet. In an alternative embodiment, force distribution members may be removeably affixed to the helmet and capable of being repositioned on perimeter 103 of the helmet. Force distribution members may affix, either permanently or removeably, along various points of upper exterior 105 of shoulder pads 104.

In one embodiment, force distribution members 106 are positioned between helmet 102 and shoulder pads 104. In a further embodiment, force distribution members 106 may be comprised of a non-Newtonian fluid allowing the modulus of elasticity properties to be exploited. In one embodiment, the force distribution members may be assembled from a non-Newtonian fluid, such as a viscoelastic solid or liquid suspension. For purposes of example only, one embodiment may include a mixture comprising a cross-linked polydimethylsiloxane (PDMS), the silicone ingredient in silly putty. For example, fluids exhibiting rheopectic and/or dilatant or shear thickening properties may be employed. Examples of suitable non-Newtonian fluids include: pseudo-homogeneous mixtures including foams, emulsions, suspensions and pastes, macro-molecular systems (polymer melts and solutions, protein solutions), salt solutions, surfactants (soap solutions), reinforced plastics and polymers in their molten state. In one embodiment, the non-Newtonian fluid is not a foam. Particularly, suitable non-Newtonian fluids will exhibit dilatant and/or Rheopectic properties such that when shear is applied, viscosity increases.

A dilatant (also termed shear thickening) material is one in which viscosity increases with the rate of shear strain. Such a shear thickening fluid, also known by the initialism STF, is an example of a non-Newtonian fluid. A dilatant is a non-Newtonian fluid where the shear viscosity increases with applied shear stress. This behavior is only one type of deviation from Newton's Law, and it is controlled by such factors as particle size, shape, and distribution. The properties of these suspensions depend on Hamaker theory and Van der Waals forces and can be stabilized electrostatically or sterically. Shear thickening behavior occurs when a colloidal suspension transitions from a stable state to a state of flocculation. A large portion of the properties of these systems are due to the surface chemistry of particles in dispersion, known as colloids. This can readily be seen with a mixture of cornstarch and water (sometimes called oobleck), which acts in counterintuitive ways when struck or thrown against a surface. Sand that is completely soaked with water also behaves as a dilatant material. This is the reason why when walking on wet sand, a dry area appears directly underfoot. Silica and polyethylene glycol is another example of a Non-Newtonian fluid and may be used for purposes of the current disclosure. The non-Newtonian fluids used in the current disclosure are preferably liquids and/or liquid suspensions at room temperature. In one embodiment, the non-Newtonian fluids of the current disclosure have a freezing point at or below 10.4° F. However, this freezing point may be lowered to as low as −49° F. by depressing the freezing point of the Non-Newtonian liquid, as known to those of skill in the art.

Rheopecty is a similar property to a dilatant where viscosity increases with cumulative stress or agitation over time.

In reality, most fluids are non-Newtonian, which means that their viscosity is dependent on shear rate (Shear Thinning or Thickening) or the deformation history (Thixotropic fluids). In contrast to Newtonian fluids, non-Newtonian fluids display either a non-linear relation between shear stress and shear rate, have a yield stress, or viscosity that is dependent on time or deformation history (or a combination of all the above).

Non-Newtonian fluids change their viscosity or flow behavior under stress. If one applies a force to such fluids, the sudden application of stress can cause them to get thicker and act like a solid, or in some cases it results in the opposite behavior and they may become runnier. Remove the stress (let them sit still or only move them slowly) and they will return to their earlier state Non-Newtonian behavior of fluids can be caused by several factors, all of them related to structural reorganization of the fluid molecules due to flow. In polymer melts and solutions, it is the alignment of the highly anisotropic chains what results in a decreased viscosity. In colloids, it is the segregation of the different phases in the flow that causes a shear thinning behavior.

Further, the non-Newtonian fluid of the current disclosure may comprise a stabilized suspension. A suspension is composed of a fine, particulate phase dispersed throughout a differing, heterogeneous phase. Shear-thickening behavior is observed in systems with a solid, particulate phase dispersed within a liquid phase. These solutions are different from a Colloid in that they are unstable; the solid particles in dispersion are sufficiently large for sedimentation, causing them to eventually settle. Whereas the solids dispersed within a colloid are smaller and will not settle. There are multiple methods for stabilizing suspensions, including electrostatics and sterics.

In an unstable suspension, the dispersed, particulate phase will come out of solution in response to forces acting upon the particles, such as gravity or Hamaker attraction. The magnitude of the effect these forces have on pulling the particulate phase out of solution is proportional to the size of the particulates; for a large particulate, the gravitational forces are greater than the particle-particle interactions, whereas the opposite is true for small particulates. Shear thickening behavior is typically observed in suspensions of small, solid particulates, indicating that the particle-particle Hamaker attraction is the dominant force. Therefore, stabilizing a suspension is dependent upon introducing a counteractive repulsive force.

Hamaker theory describes the attraction between bodies, such as particulates. It was realized that the explanation of Van der Waals forces could be upscaled from explaining the interaction between two molecules with induced dipoles to macro-scale bodies by summing all the intermolecular forces between the bodies. Similar to Van der Waals forces, Hamaker theory describes the magnitude of the particle-particle interaction as inversely proportional to the square of the distance. Therefore, many stabilized suspensions incorporate a long-range repulsive force that is dominant over Hamaker attraction when the interacting bodies are at a sufficient distance, effectively preventing the bodies from approaching one another. However, at short distances, the Hamaker attraction dominates, causing the particulates to coagulate and fall out of solution. Two common long-range forces used in stabilizing suspensions are electrostatics and sterics.

Electrostatically Stabilized Suspensions.

Suspensions of similarly charged particles dispersed in a liquid electrolyte are stabilized through an effect described by the Helmholtz double layer model. The model has two layers. The first layer is the charged surface of the particle, which creates an electrostatic field that affects the ions in the electrolyte. In response, the ions create a diffuse layer of equal and opposite charge, effectively rendering the surface charge neutral. However, the diffuse layer creates a potential surrounding the particle that differs from the bulk electrolyte.

The diffuse layer serves as the long-range force for stabilization of the particles. When particles near one another, the diffuse layer of one particle overlaps with that of the other particle, generating a repulsive force. The following equation provides the energy between two colloids as a result of the Hamaker interactions and electrostatic repulsion.

$$V = \pi R \left( \frac{-H}{12\pi h^2} + \frac{64 C k T \Gamma^2 e^\kappa h}{\kappa^2} \right)$$

where:

$V$ = energy between a pair of colloids, $R$ = radius of colloids, $-H$ = Hamaker constant between colloid and solvent, $h$ = distance between colloids, $C$ = surface ion concentration, $k$ = Boltzmann constant, $T$ = temperature in kelvins, $\Gamma$ = surface excess, $K$ = inverse Debye length.

Sterically Stabilized Suspensions.

Different from electrostatics, sterically stabilized suspensions rely on the physical interaction of polymer chains attached to the surface of the particles to keep the suspension stabilized; the adsorbed polymer chains act as a spacer to keep the suspended particles separated at a sufficient distance to prevent the Hamaker attraction from dominating and pulling the particles out of suspension. The polymers are typically either grafted or adsorbed onto the surface of the particle. With grafted polymers, the backbone of the polymer chain is covalently bonded to the particle surface. Whereas an adsorbed polymer is a copolymer composed of lyophobic and lyophilic region, where the lyophobic region non-covalently adheres to the particle surface and the lyophilic region forms the steric boundary or spacer.

In one embodiment of the current disclosure, force distribution members 106, 108 and 110 may be flexible until a transit strike force occurs. At transit strike force, the non-Newtonian fluid within the members becomes "rigid" and the force is transferred from helmet 102 to the shoulder pads 104 through the force distribution members 106, 108, and 110. This force transfer will alleviate the impact force to the wearer's head in the helmet. These force distribution members may act as "little shock distributors" to transfer the helmet's impact to the shoulder pads thereby protecting the athlete from traumatic brain injury.

Figure 7:
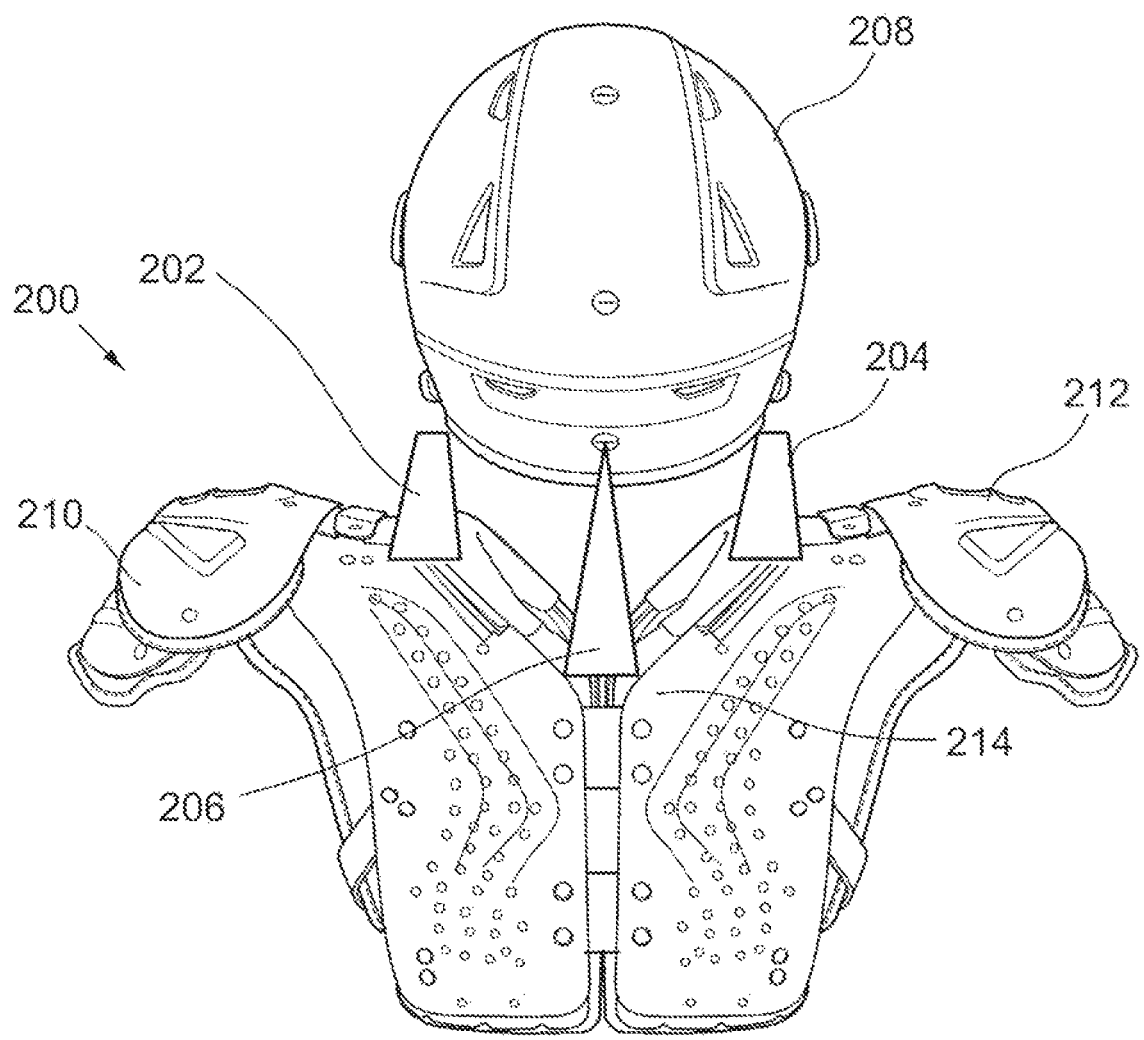
FIG. 7 shows a rear view of an alternative embodiment of a force distribution system of the current disclosure.

FIG. 7 shows a rear view of an alternative embodiment of a force distribution system 200. In this view, force distribution members 202, 204, and 206 are provided. As show by FIG. 7, force distribution members may be trapezoidal or triangular in shape and arranged at the sides and back of helmet 208 and affixed to not only upper surface 210 of shoulder pad 212, but also to rear outer surface 214 of shoulder pad 212.

Figure 8:
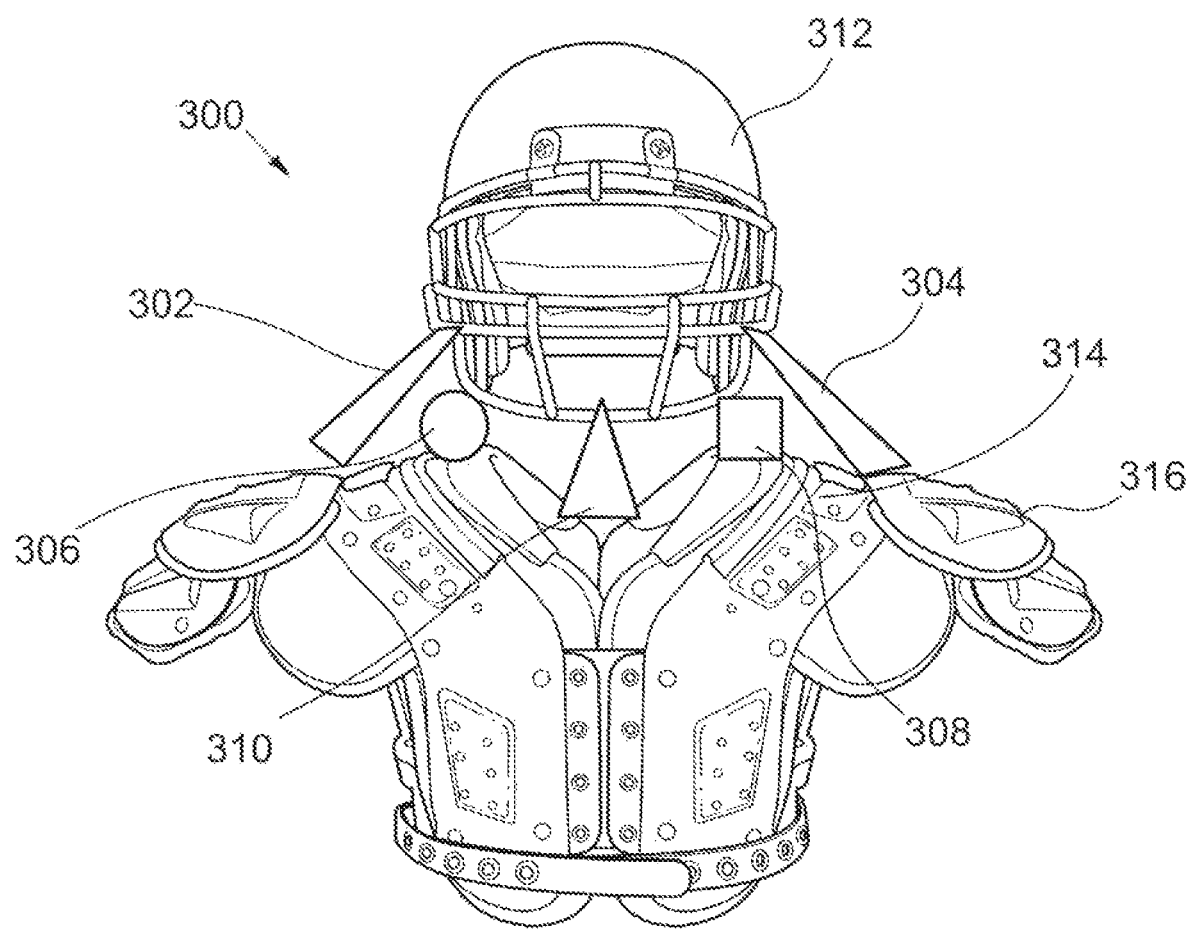
FIG. 8 shows a front view of a still further alternative embodiment of a force distribution system of the current disclosure.

FIG. 8 shows a front view of a still further alternative embodiment of a force distribution system 300. In this view, force distribution members 302, 304, 306, 308, and 310 are shown providing connections between helmet 312 and upper surface 314 of shoulder pads 316. As FIG. 8 illustrates, various shapes and placements of the force distribution members are possible. Further, different shaped force distribution members, such as spherical shapes shown by 306 and cube shapes shown by 308 may be employed simultaneously to improve shock distribution between helmet 312 and shoulder pads 316. Indeed, as shown by the relative positions of force distribution members 302 and 306, both "inner" and "outer" members may be used in order to provide layers of force distribution members.

Figure 9:
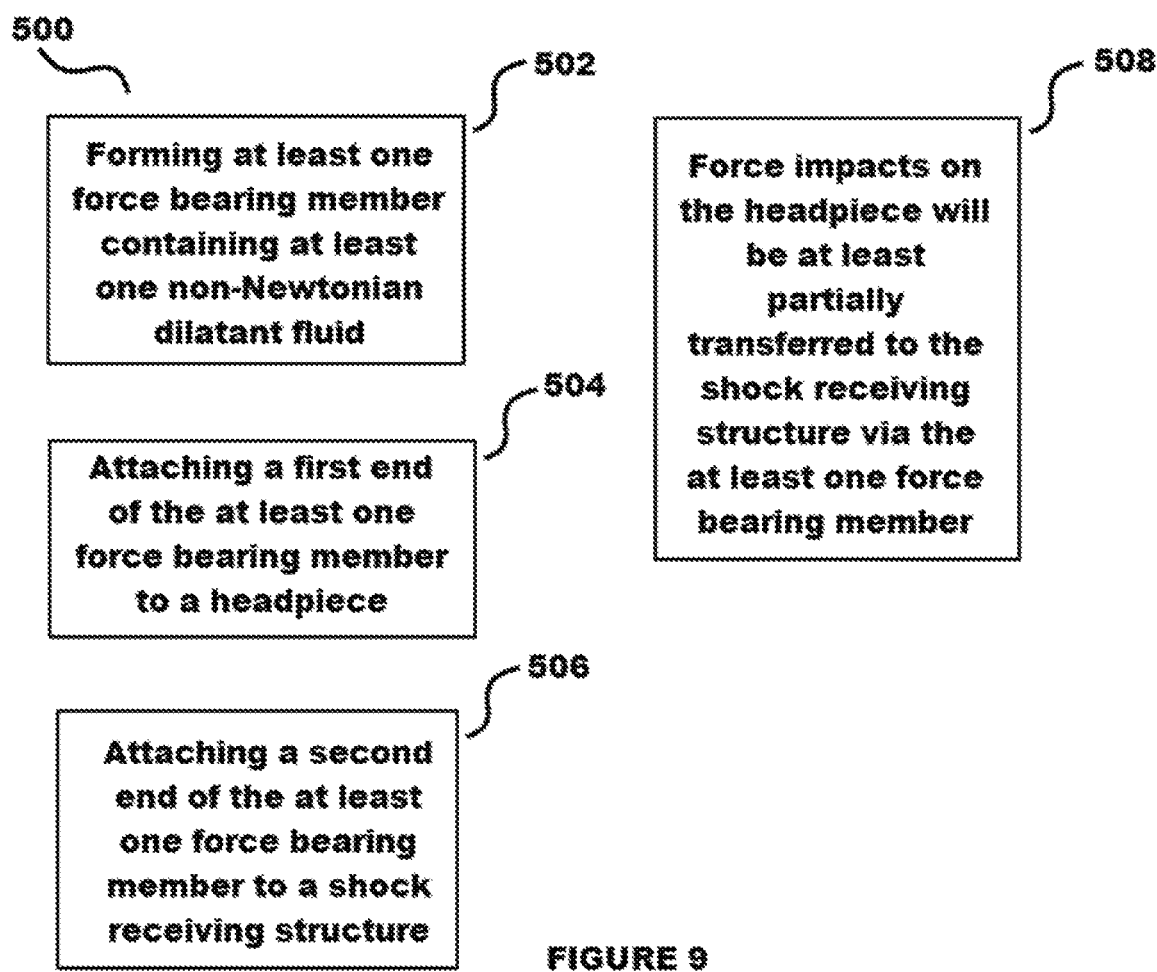
FIG. 9 shows a method of distributing force per the current disclosure.

The present disclosure also provides methods of dispersing impact force as well as methods of retrofitting existing equipment. In one embodiment, a method for dispersing impact is provided. This method 500, see FIG. 9, includes at 502, forming at least one force bearing member. The at least one force bearing member contains at least one non-Newtonian dilatant fluid. At 504, a first end of the at least one force bearing is attached to a headpiece. At 506, a second end of the at least one force bearing member is attached to a shock receiving structure. At 508, force impacts on the headpiece will be at least partially transferred to the shock receiving structure via the at least one force bearing member.

Figure 10:
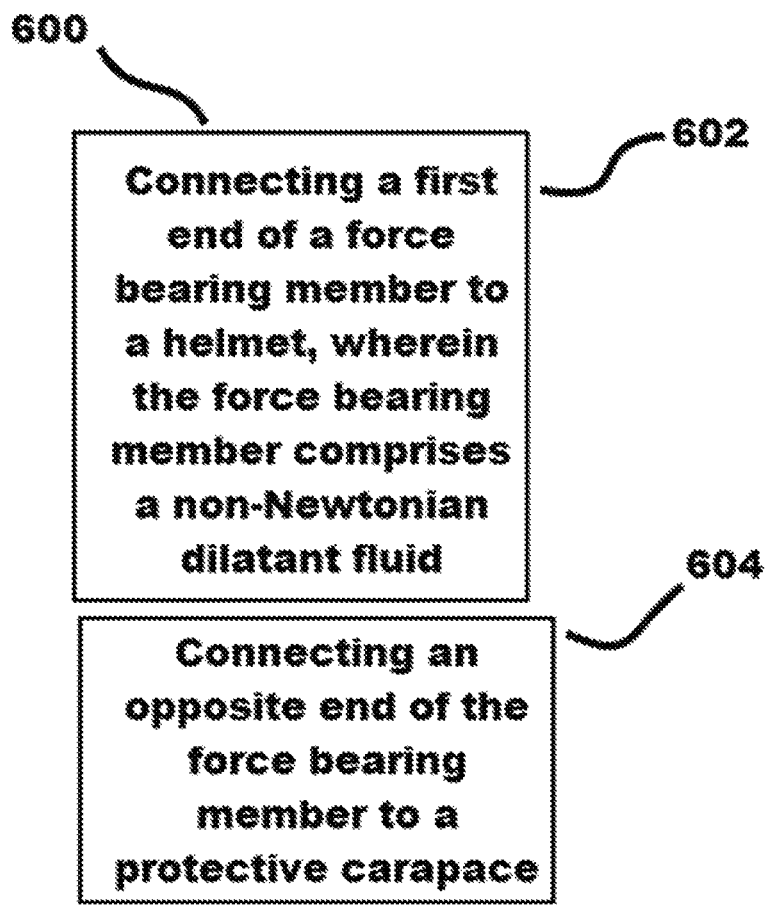
FIG. 10 shows a method of retrofitting existing safety wear per the current disclosure.

In a further embodiment, a method of retrofitting existing protective equipment to improve force transfer is provided. This method 600, see FIG. 10, to a includes at 602 connecting a first end of a force bearing member to a helmet. At 604, an opposite end of the force bearing member is connected to a protective carapace. The force bearing member comprising a non-Newtonian dilatant fluid.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A force distribution system comprising:
    a helmet;
    a protective carapace;
    wherein the helmet is in physical communication with the protective carapace at at least three points, wherein physical communication is achieved via affixing at least three force bearing members to at least three locations on the helmet and at least three locations on the protective carapace in non-static affixment;
    one force bearing member is positioned at a back of the helmet;
    at least two other force bearing members are positioned at a side of the helmet and layered such that a first outer side force bearing member is positioned over and distanced from a first inner side force bearing member; and
    wherein the force bearing members comprise a non-Newtonian dilatant fluid.

2. The force distribution system of claim 1, wherein the protective carapace at least partially covers the shoulders of a user.

3. The force distribution system of claim 1, wherein the helmet is a sports helmet.

4. The force distribution system of claim 1, wherein the protective carapace comprises a shoulder pad protective system.

5. The force distribution system of claim 1, wherein at least two force distribution members connect the helmet to the protective carapace.

6. The force distribution system of claim 1, wherein the force distribution members are permanently affixed to the helmet and protective carapace.

7. The force distribution system of claim 1, wherein the force bearing member does not comprise a foam.

8. The force distribution system of claim 1, wherein the non-Newtonian dilatant fluid is liquid at room temperature.

9. The force distribution system of claim 1, wherein the non-Newtonian dilatant fluid comprises a suspension.

10. The force distribution system of claim 1, wherein the non-Newtonian dilatant fluid comprises silica and polyethylene glycol.

11. The force distribution system of claim 1, wherein the non-Newtonian dilatant fluid comprises cross-linked polydimethylsiloxane.

12. A method of force distribution comprising:
    forming at least three force bearing members wherein the at least three force bearing members contain at least one non-Newtonian dilatant fluid;
    attaching a first end of one force bearing member to a headpiece at a back of the headpiece;
    attaching a second end of the one force bearing member to a shock receiving structure substantially adjacent the back of the headpiece;
    positioning and layering at least two other force bearing members at a side of the headpiece such that a first outer side force bearing member is positioned over and distanced from a first inner side force bearing member; and
    wherein force impacts on the headpiece will be at least partially transferred to the shock receiving structure via the at least three force bearing members.

13. The method of force distribution of claim 12, wherein the non-Newtonian dilatant fluid is liquid at room temperature.

14. The force distribution system of claim 12, wherein the non-Newtonian dilatant fluid comprises a suspension.

15. The force distribution system of claim 12, wherein the non-Newtonian dilatant fluid comprises silica and polyethylene glycol.

16. The force distribution system of claim 12, wherein the non-Newtonian dilatant fluid comprises cross-linked polydimethylsiloxane.

17. A method of retrofitting protective equipment to improve force transfer including:
    connecting one end of at least one force bearing member to a helmet at a back of the helmet;
    connecting an opposite end of at least one force bearing member to a protective carapace substantially adjacent the back of the helmet, wherein the helmet and protective carapace were not connected to one another when worn before addition of the at least on force bearing member;
    connecting and layering at least two other force bearing members at a side of the helmet such that a first outer side force bearing member is positioned over and distanced away from a first inner side force bearing member and
    wherein the force bearing members comprise a non-Newtonian dilatant fluid.

18. The force distribution system of claim 17, wherein the non-Newtonian dilatant fluid is liquid at room temperature.

19. The force distribution system of claim 17, wherein the non-Newtonian dilatant fluid comprises a suspension.

20. The force distribution system of claim 1, wherein the non-Newtonian dilatant fluid comprises silica and polyethylene glycol.

21. The force distribution system of claim 1, wherein the non-Newtonian dilatant fluid comprises cross-linked polyclimethylsiloxane.

\* \* \* \* \*